United States Patent
Ma

(10) Patent No.: US 10,382,615 B2
(45) Date of Patent: Aug. 13, 2019

(54) INTELLIGENT ALERTING METHOD, TERMINAL, WEARABLE DEVICE, AND SYSTEM

(71) Applicant: Huawei Technologies Co., Ltd., Shenzhen (CN)

(72) Inventor: Jianke Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/072,114

(22) PCT Filed: Jun. 2, 2017

(86) PCT No.: PCT/CN2017/087030
§ 371 (c)(1),
(2) Date: Jul. 23, 2018

(87) PCT Pub. No.: WO2017/206952
PCT Pub. Date: Dec. 7, 2017

(65) Prior Publication Data
US 2019/0045046 A1   Feb. 7, 2019

(30) Foreign Application Priority Data

Jun. 2, 2016   (CN) .......................... 2016 1 0391014

(51) Int. Cl.
*H04M 1/725* (2006.01)
*G05B 19/042* (2006.01)
(Continued)

(52) U.S. Cl.
CPC ...... *H04M 1/72569* (2013.01); *G05B 19/042* (2013.01); *G06F 3/01* (2013.01);
(Continued)

(58) Field of Classification Search
CPC ........ H04L 67/12; H04L 67/22; H04W 4/027; H04W 4/08; H04W 88/02; H04W 68/00;
(Continued)

(56) References Cited

U.S. PATENT DOCUMENTS

2011/0267196 A1   11/2011   Hu et al.
2013/0154838 A1   6/2013   Alameh et al.
(Continued)

FOREIGN PATENT DOCUMENTS

CN   104065818 A   9/2014
CN   105167746 A   12/2015
(Continued)

OTHER PUBLICATIONS

Machine Translation and Abstract of Chinese Publication No. CN104065818, Sep. 24, 2014, 26 pages.
(Continued)

*Primary Examiner* — Nizar N Sivji
(74) *Attorney, Agent, or Firm* — Conley Rose, P.C.

(57) ABSTRACT

An intelligent alerting method and a terminal to obtain human body status information and determine an alerting occasion and mode according to the human body status information, where the method includes: obtaining, by a terminal, human body status information of a user, where the human body status information is status information obtained after basic human body parameter data is combined, the human body status information representing a body status of the user, and the basic human body parameter data is vital sign data obtained through detection by the terminal or by a wearable device that has a communications connection relationship with the terminal determining, by the terminal, an alerting mode according to the human body status information and a predefined alerting policy, and providing, by the terminal, a corresponding alert according to the alerting mode.

19 Claims, 7 Drawing Sheets

(51) Int. Cl.

| | |
|---|---|
| *G06F 3/01* | (2006.01) |
| *H04M 1/57* | (2006.01) |
| *H04M 3/436* | (2006.01) |
| *H04W 68/00* | (2009.01) |
| *H04M 3/02* | (2006.01) |
| *H04W 4/16* | (2009.01) |

(52) U.S. Cl.
CPC ......... *H04M 1/571* (2013.01); *H04M 1/7258* (2013.01); *H04M 3/02* (2013.01); *H04M 3/436* (2013.01); *H04W 68/00* (2013.01); *H04W 4/16* (2013.01)

(58) Field of Classification Search
CPC ........ H04W 4/16; G06F 19/3418; G06F 3/01; G01P 15/00; G01C 21/16; G01C 22/006; G16H 40/67; G08B 21/18; G08B 21/043; G08B 21/0461; G08B 25/001; G08B 25/016; G08B 23/00; H04N 21/42201; H04M 1/72569; H04M 1/571; H04M 1/7258; H04M 3/436; H04M 3/02; G05B 19/042
See application file for complete search history.

(56) References Cited

U.S. PATENT DOCUMENTS

| | | | | |
|---|---|---|---|---|
| 2014/0273858 | A1* | 9/2014 | Panther | A61B 5/0002 455/41.2 |
| 2015/0170494 | A1* | 6/2015 | Hsu | G06F 19/3418 340/539.17 |
| 2016/0012702 | A1* | 1/2016 | Hart | G08B 21/043 340/584 |
| 2017/0014079 | A1* | 1/2017 | Lee | A61B 7/00 |
| 2017/0116845 | A1* | 4/2017 | See | G08B 25/016 |
| 2017/0124276 | A1* | 5/2017 | Tee | G16H 10/60 |

FOREIGN PATENT DOCUMENTS

| | | |
|---|---|---|
| CN | 105373229 A | 3/2016 |
| CN | 105425657 A | 3/2016 |
| CN | 105446578 A | 3/2016 |
| CN | 105515953 A | 4/2016 |

OTHER PUBLICATIONS

Machine Translation and Abstract of Chinese Publication No. CN105167746, Dec. 23, 2015, 25 pages.
Machine Translation and Abstract of Chinese Publication No. CN105373229, Mar. 2, 2016, 16 pages.
Machine Translation and Abstract of Chinese Publication No. CN105425657, Mar. 23, 2016, 28 pages.
Machine Translation and Abstract of Chinese Publication No. CN105446578, Mar. 30, 2016, 19 pages.
Foreign Communication From a Counterpart Application, PCT Application No. PCT/CN2017/087030, English Translation of International Search Report dated Jul. 26, 2017, 3 pages.
Machine Translation and Abstract of Chinese Publication No. CN105515953, Apr. 20, 2016, 24 pages.
Foreign Communication From a Counterpart Application, Chinese Application No. 201610391014.X, Chinese Office Action dated Mar. 18, 2019, 11 pages.

* cited by examiner

INTELLIGENT ALERTING METHOD, TERMINAL, WEARABLE DEVICE, AND SYSTEM

CROSS-REFERENCE TO RELATED APPLICATIONS

This application is a U.S. National Stage of International Patent Application No. PCT/CN2017/087030 filed on Jun. 2, 2017, which claims priority to Chinese Patent Application No. 201610391014.X filed on Jun. 2, 2016. Both of the aforementioned applications are hereby incorporated by reference in their entireties.

TECHNICAL FIELD

The present invention relates to the field of communications technologies, and in particular, to an intelligent alerting method, a terminal, a wearable device, and a system.

BACKGROUND

Currently, with popularity of smartphones, peripheral derivative products, for example, wearable devices such as band devices and smartwatches, are also increasingly popular.

Currently, a wearable device already has a function of monitoring sleep quality of a user in real time, and is already capable of classifying and measuring duration of deep sleep and duration of light sleep of the user. On a smartphone, modules such as an alarm clock and a calendar already have a function of timed alerting according to a user setting, and a phone module and all types of text communications software also have functions for alerting against various events.

However, those alerting functions are non-intelligent, and cannot intelligently notify the user according to an actual situation of the user.

SUMMARY

Embodiments of the present invention provide an intelligent alerting method, a terminal, a wearable device, and a system to determine an alerting occasion and mode according to human body status information.

In view of this, a first aspect of the present invention provides an intelligent alerting method, including:

Modules such as an alarm clock and a calendar on a conventional terminal (mobile phone) already have a function of timed alerting according to a user setting, and a phone module and all types of text communications software also have functions for alerting against various events. However, the alerting is non-intelligent, and cannot intelligently notify a user according to an actual situation of the user. The present invention provides an intelligent alerting method to intelligently determine various alerting occasions and modes according to a current body status of the user. Specifically, the method includes: obtaining, by a terminal, human body status information of a user, where the human body status information is status information obtained after basic human body parameter data is combined, the human body status information is used to represent a body status of the user, and the basic human body parameter data is vital sign data obtained through detection by the terminal or by a wearable device that has a communications connection relationship with the terminal; determining, by the terminal, an alerting mode according to the human body status information and a predefined alerting policy; and giving, by the terminal, a corresponding alert according to the alerting mode.

Obviously, on one hand in the present invention, the basic human body parameter data may be transferred to the mobile phone through communication between the wearable device and the mobile phone, so that various alerting services on the mobile phone can intelligently determine various alerting occasions and modes according to the current body status of the user. On the other hand in the present invention, the basic human body parameter data may be obtained through detection by the mobile phone (without the wearable device), and this also achieves an objective of intelligently determining various alerting occasions and modes.

In some possible implementations, the obtaining, by a terminal, human body status information of a user includes: when an incoming call is received, if the terminal determines, according to a preset incoming call level, that an incoming call level of the incoming call is a low level, obtaining, by the terminal, the human body status information of the user; and the determining, by the terminal, an alerting mode according to the human body status information and a predefined alerting policy includes: determining, by the terminal according to the human body status information, that the user is in a sleep state; and when the user is in the sleep state, determining, by the terminal according to the predefined alerting policy, to keep muted.

Optionally, the alerting policy may include: 1. giving a ringing alert; 2. giving a ringing alert after a delay; 3. giving a ringing alert after an accumulated quantity of times; 4. giving a message alert; and 5. giving a vibrating alert. Giving a ringing alert means alerting the user by using a speaker of the terminal (mobile phone). Ring volume may be adjusted automatically according to the human body status information. Giving a ringing alert after a delay means not giving a ringing alert when an event occurs, but giving a ringing alert when a preset delay time arrives. For example, when a time specified by an alarm clock arrives but a sleep time of the user does not reach preset duration, the alarm clock does not ring. The alarm clock automatically rings when a sleep event reaches the preset duration. Giving a ringing alert after an accumulated quantity of times means giving a ringing alert to the user if an event occurs N times consecutively within a limited time range, where a numeric value of N may be preset by the user freely. Giving a message alert means that the user may be mutedly notified of occurrence of an event by using a message when it is inconvenient to alert the user in an intense disturbing mode such as ringing and/or vibrating. Giving a vibrating alert means that vibration may be used to help alert the user when a ringing alert occurs, where a vibration amplitude may be determined according to the human body status information.

In other possible implementations, the method further includes: if the terminal determines, according to the preset incoming call level, that the incoming call level of the incoming call is a high level, determining, by the terminal, an alerting mode according to the predefined alerting policy, where the alerting mode includes at least one of giving a ringing alert with maximum volume or giving a vibrating alert.

Obviously, the high level incoming call is a major event, and is generally an incoming call from an important person. For the incoming call from the important person, whichever state the human body is in, the user is alerted normally in a preset alerting mode.

In other possible implementations, after the determining, by the terminal according to the incoming call alerting policy, to keep muted, the method further includes: if a quantity of incoming calls received by the terminal from a same contact within a preset time exceeds a preset threshold, determining, by the terminal, to give a ringing alert.

Optionally, the preset time is 1 minute, and the preset threshold is 2.

In other possible implementations, the obtaining, by a terminal, human body status information of a user includes: when an incoming call is received, obtaining, by the terminal, the human body status information of the user; and the determining, by the terminal, an alerting mode according to the human body status information and a predefined alert includes: determining, by the terminal according to the human body status information, that the user is in a moving state; and when the user is in the moving state, determining, by the terminal according to the predefined alerting policy, to increase ring volume and/or vibration strength.

In other possible implementations, the obtaining, by a terminal, human body status information of a user includes: when an alerting time of an alarm clock arrives, if the terminal determines that the predefined alerting policy is set, obtaining, by the terminal, the human body status information of the user; and the determining, by the terminal, an alerting mode according to the human body status information and a predefined alerting policy includes: determining, by the terminal according to the human body status information, that the user is in a sleep state; and when the user is in the sleep state, if the terminal determines, according to the human body status information, that a sleep time of the user in the sleep state reaches preset duration, determining, by the terminal according to the predefined alerting policy, to ring the alarm clock.

In other possible implementations, if the terminal determines, according to the human body status information, that the sleep time of the user in the sleep state does not reach the preset duration, the method further includes: determining, by the terminal according to the predefined alerting policy, to alert the user by using a message; or if the terminal determines that a current date is a workday, determining, by the terminal according to the predefined alerting policy, to ring the alarm clock.

In other possible implementations, the obtaining, by a terminal, human body status information of a user includes: receiving, by the terminal, the basic human body parameter data sent by the wearable device; and obtaining, by the terminal, the human body status information by performing combination processing on the basic human body parameter data by using a preset algorithm.

A second aspect of the present invention provides an intelligent alerting method, including:

detecting, by a wearable device, basic human body parameter data; obtaining, by the wearable device, human body status information of a user by performing combination processing on the basic human body parameter data by using a preset algorithm, where the human body status information is used to represent a body status of the user; and sending, by the wearable device, the human body status information to a terminal, so that the terminal determines an alerting mode according to the human body status information and a predefined alerting policy and gives a corresponding alert according to the alerting mode; and/or determining, by the wearable device, an alerting mode according to the human body status information and a predefined alerting policy, and giving a corresponding alert according to the alerting mode.

A third aspect of the present invention provides an intelligent alerting method, including: detecting, by a wearable device, basic human body parameter data; and sending, by the wearable device, the basic human body parameter data to a terminal, so that the terminal obtains human body status information of a user by performing combination processing on the basic human body parameter data by using a preset algorithm, determines an alerting mode according to the human body status information and a predefined alerting policy, and gives a corresponding alert according to the alerting mode; and/or sending, by the wearable device, the basic human body parameter data to a terminal; receiving, by the wearable device, human body status information sent by the terminal, where the human body status information is information obtained by the terminal by performing combination processing on the basic human body parameter data by using a preset algorithm; and determining, by the wearable device, an alerting mode according to the human body status information and a predefined alerting policy, and giving a corresponding alert according to the alerting mode, where the human body status information is used to represent a body status of the user.

A fourth aspect of the present invention provides a terminal, including:

an obtaining module, configured to obtain human body status information of a user, where the human body status information is status information obtained after basic human body parameter data is combined, the human body status information is used to represent a body status of the user, and the basic human body parameter data is vital sign data obtained through detection by the terminal or by a wearable device that has a communications connection relationship with the terminal;

a determining module, configured to determine an alerting mode according to the human body status information and a predefined alerting policy; and an alerting module, configured to give a corresponding alert according to the alerting mode.

In some possible implementations, the obtaining module is specifically configured to obtain the human body status information of the user when an incoming call is received if it is determined, according to a preset incoming call level, that an incoming call level of the incoming call is a low level; and the determining module is specifically configured to determine, according to the human body status information, that the user is in a sleep state, and when the user is in the sleep state, determine, according to the predefined alerting policy, to keep muted.

In other possible implementations, the determining module is further configured to determine an alerting mode according to the predefined alerting policy if it is determined, according to the preset incoming call level, that the incoming call level of the incoming call is a high level, where the alerting mode includes at least one of giving a ringing alert with maximum volume or giving a vibrating alert.

In other possible implementations, the determining module is further configured to determine to give a ringing alert if a quantity of incoming calls received by the terminal from a same contact within a preset time exceeds a preset threshold.

In other possible implementations, the obtaining module is specifically configured to obtain the human body status information of the user when an incoming call is received; and the determining module is specifically configured to determine, according to the human body status information, that the user is in a moving state, and when the user is in the moving state, determine, according to the predefined alerting policy, to increase ring volume and/or vibration strength.

In other possible implementations, the obtaining module is specifically configured to obtain the human body status information of the user when an alerting time of an alarm clock arrives if it is determined that the predefined alerting policy is set; and the determining module is specifically configured to determine, according to the human body status information, that the user is in a sleep state, and when the user is in the sleep state, if it is determined, according to the human body status information, that a sleep time of the user in the sleep state reaches preset duration, determine, according to the predefined alerting policy, to ring the alarm clock.

In other possible implementations, if it is determined, according to the human body status information, that the sleep time of the user in the sleep state does not reach the preset duration, the determining module is further configured to determine, according to the predefined alerting policy, to alert the user by using a message, or if it is determined that a current date is a workday, determine, according to the predefined alerting policy, to ring the alarm clock.

In other possible implementations, the obtaining module is specifically configured to receive the basic human body parameter data sent by the wearable device, and obtain the human body status information by performing combination processing on the basic human body parameter data by using a preset algorithm.

A fifth aspect of the present invention provides a wearable device, including:

a detection module, configured to detect basic human body parameter data;

a first processing module, configured to obtain human body status information of a user by performing combination processing on the basic human body parameter data by using a preset algorithm, where the human body status information is used to represent a body status of the user; and a second processing module, configured to send the human body status information to a terminal, so that the terminal determines an alerting mode according to the human body status information and a predefined alerting policy and gives a corresponding alert according to the alerting mode; and/or configured to determine an alerting mode according to the human body status information and a predefined alerting policy, and give a corresponding alert according to the alerting mode.

A sixth aspect of the present invention provides a wearable device, including:

a detection module, configured to detect basic human body parameter data; and a processing module, configured to send the basic human body parameter data to a terminal, so that the terminal obtains human body status information of a user by performing combination processing on the basic human body parameter data by using a preset algorithm, determines an alerting mode according to the human body status information and a predefined alerting policy, and gives a corresponding alert according to the alerting mode; and/or configured to send the basic human body parameter data to a terminal, receive human body status information sent by the terminal, where the human body status information is information obtained by the terminal by performing combination processing on the basic human body parameter data by using a preset algorithm, determine an alerting mode according to the human body status information and a predefined alerting policy, and give a corresponding alert according to the alerting mode, where the human body status information is used to represent a body status of the user.

A seventh aspect of the present invention provides a terminal, including:

a receiver and a processor, where the receiver is configured to obtain human body status information of a user, where the human body status information is status information obtained after basic human body parameter data is combined, the human body status information is used to represent a body status of the user, and the basic human body parameter data is vital sign data obtained through detection by the processor or by a wearable device that has a communications connection relationship with the receiver; and the processor is configured to determine an alerting mode according to the human body status information and a predefined alerting policy, and give a corresponding alert according to the alerting mode.

In some possible implementations, the receiver is specifically configured to obtain the human body status information of the user when an incoming call is received if the processor determines, according to a preset incoming call level, that an incoming call level of the incoming call is a low level; and the processor is specifically configured to determine, according to the human body status information, that the user is in a sleep state, and when the user is in the sleep state, determine, according to the predefined alerting policy, to keep muted.

In other possible implementations, the processor is further configured to determine an alerting mode according to the predefined alerting policy if it is determined, according to the preset incoming call level, that the incoming call level of the incoming call is a high level, where the alerting mode includes at least one of giving a ringing alert with maximum volume or giving a vibrating alert.

In other possible implementations, the processor is further configured to determine to give a ringing alert if a quantity of incoming calls received by the receiver from a same contact within a preset time exceeds a preset threshold.

In other possible implementations, the receiver is specifically configured to obtain the human body status information of the user when an incoming call is received; and the processor is specifically configured to determine, according to the human body status information, that the user is in a moving state, and when the user is in the moving state, determine, according to the predefined alerting policy, to increase ring volume and/or vibration strength.

In other possible implementations, the receiver is specifically configured to obtain the human body status information of the user when an alerting time of an alarm clock arrives if the processor determines that the predefined alerting policy is set; and the processor is specifically configured to determine, according to the human body status information, that the user is in a sleep state, and when the user is in the sleep state, if the processor determines, according to the human body status information, that a sleep time of the user in the sleep state reaches preset duration, determine, by the processor according to the predefined alerting policy, to ring the alarm clock.

In other possible implementations, the processor is further configured to: if it is determined, according to the human body status information, that the sleep time of the user in the sleep state does not reach the preset duration, determine, according to the predefined alerting policy, to alert the user by using a message, or if it is determined that a current date is a workday, determine, according to the predefined alerting policy, to ring the alarm clock.

In other possible implementations, the receiver is further configured to receive the basic human body parameter data sent by the wearable device; and the processor is further configured to obtain the human body status information by performing combination processing on the basic human body parameter data by using a preset algorithm.

An eighth aspect of the present invention provides a wearable device, including:

a processor and a transmitter, where the processor is configured to detect basic human body parameter data, and obtain human body status information of a user by performing combination processing on the basic human body parameter data by using a preset algorithm, where the human body status information is used to represent a body status of the user; and the transmitter is configured to send the human body status information to a terminal, so that the terminal determines an alerting mode according to the human body status information and a predefined alerting policy and gives a corresponding alert according to the alerting mode; and/or the processor is further configured to determine an alerting mode according to the human body status information and a predefined alerting policy, and give a corresponding alert according to the alerting mode.

A ninth aspect of the present invention provides a wearable device, including:

a processor, a transmitter, and a receiver, where the processor is configured to detect basic human body parameter data; and the transmitter is configured to send the basic human body parameter data to a terminal, so that the terminal obtains human body status information of a user by performing combination processing on the basic human body parameter data by using a preset algorithm, determines an alerting mode according to the human body status information and a predefined alerting policy, and gives a corresponding alert according to the alerting mode; and/or the transmitter is configured to send the basic human body parameter data to a terminal; the receiver is configured to receive human body status information sent by the terminal, where the human body status information is information obtained by the terminal by performing combination processing on the basic human body parameter data by using a preset algorithm; and the processor is further configured to determine an alerting mode according to the human body status information and a predefined alerting policy, and give a corresponding alert according to the alerting mode, where the human body status information is used to represent a body status of the user.

A tenth aspect of the present invention provides an intelligent alerting system, including the terminal provided by the eighth aspect of the present invention and the wearable device provided by the ninth aspect and the tenth aspect of the present invention.

In the technical solutions provided by the embodiments of the present invention, human body status information related to basic human body parameter data is obtained, and an alerting occasion and mode are determined intelligently according to the human body status information.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments described herein can be implemented in an order other than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Currently, an application alerting function on a terminal (for example, a smartphone) can determine an alerting mode and occasion only in a manner preset by a user. This lacks flexibility and does not reflect intelligence of an intelligent device. The applicant finds that, by using various existing sensors and related functions of a wearable device for monitoring human body parameters, through communication between the wearable device and the smartphone, for example, transferring basic human body parameter data to the smartphone, various alerting services on the smartphone can intelligently determine various alerting occasions and modes according to a current body status of the user. Alternatively, a sensor of the terminal is used to detect basic human body parameter data, corresponding combination processing is performed to obtain human body status information (the human body status information represents a body status of the user), and various alerting occasions and modes are determined intelligently.

The intelligent alerting method according to the present invention is hereinafter described by using a specific embodiment.

Figure 1:
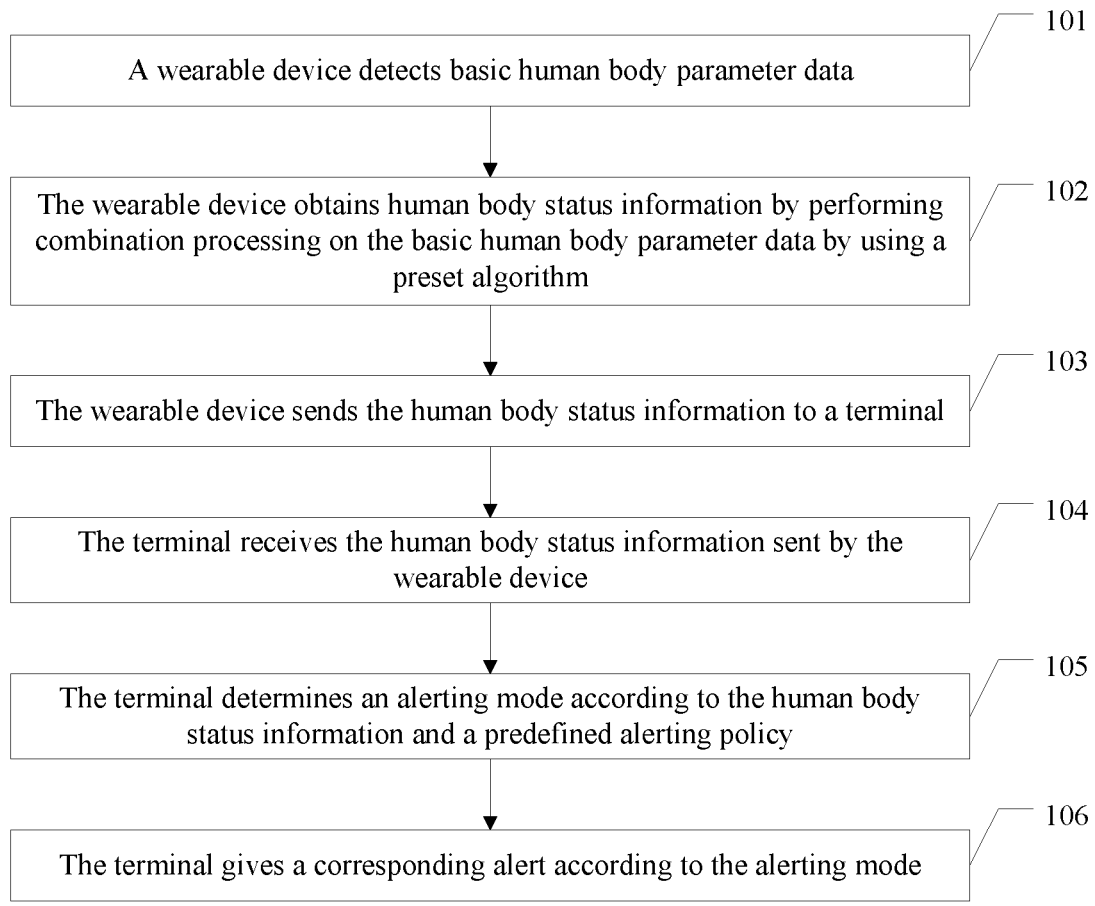
FIG. 1 is a schematic diagram of an embodiment of an intelligent alerting method according to an embodiment of the present invention.

Referring to FIG. 1, an embodiment of an intelligent alerting method in an embodiment of the present invention includes the following steps.

101. A wearable device detects basic human body parameter data.

In this embodiment, the basic human body parameter data includes temperature, blood pressure, heart rate data, or the like of a body of a user, or further includes other data. This is not limited herein. The wearable device includes a band device or a smartwatch, or further includes another device. This is not limited herein.

102. The wearable device obtains human body status information by performing combination processing on the basic human body parameter data by using a preset algorithm.

In this embodiment, the human body status information is used to represent a body status of the user. A terminal may determine, according to the human body status information, whether the user is in a sleep state, or is in a moving state, or is in another state.

Optionally, after the wearable device obtains the human body status information, the method further includes: the wearable device determines an alerting mode according to the human body status information and a predefined alerting policy. In this way, intelligent alerting on a wearable device side can be implemented.

The preset algorithm may be a common algorithm in the prior art. For example, determining a sleep stage of a sleep state of the user by using the heart rate may be specifically: first obtaining a heart rate of an examinee, calculating a heart rate period of the heart rate according to the obtained heart rate, using a difference before and after the heart rate period as a first-order difference, using a difference before and after the first-order difference as a second-order difference, and so on until a preset $N^{th}$-order difference is calculated, generating distribution data indicating distribution of each value within a predetermined time for the heart rate period and the differences from the first-order difference to the $N^{th}$-order difference, and determining a sleep stage of the examinee by referring to distribution data of each preset sleep stage.

The sleep state is a form presented during sleep of a person and is relative to a wake state. Sleep of a person includes four stages: falling asleep, light sleep, deep sleep, and continued deep sleep. A sleep process of each period may also be divided into four sleep stages from light to deep.

A moving state is a state of a moving speed relative to a reference frame when an object (referring to "the user or person" in this document) performs a mechanical motion.

103. The wearable device sends the human body status information to a terminal.

In this embodiment, by establishing a communications connection to the terminal, for example, Bluetooth, the wearable device may send the human body status information to the terminal by using Bluetooth.

104. The terminal receives the human body status information sent by the wearable device.

In this embodiment, after the wearable device sends the human body status information to the terminal, the terminal receives the human body status information sent by the wearable device.

It may be understood that, after the terminal receives the human body status information sent by the wearable device, the terminal may select to store the human body status information.

It should be noted that, the terminal may include a human body data monitoring module. The human body data monitoring module is a service that is automatically started during power-on or is started when Bluetooth is in an enabled state. In this case, the human body data monitoring module communicates with the wearable device by using Bluetooth, and receives, by using Bluetooth, the human body status information sent by the wearable device.

105. The terminal determines an alerting mode according to the human body status information and a predefined alerting policy.

In this embodiment, an application in the terminal determines an alerting mode according to the alerting policy defined by the terminal and the human body status information when alerting against an event.

It should be noted that, the alerting event may be categorized as a major event, a minor event, or a general event. The major event is a major event defined by the user, for example, an incoming call from an important person, a major event on schedule, or an alert of an alarm clock on an important date. When the major event occurs, whichever state the human body is in, the user is alerted normally by using a preset alerting policy. The minor event means that when the minor event occurs, the user may be alerted in a human body status related alerting mode that is preset by the user. For example, when there is a less important incoming call, when the human body is in the sleep state, a ringing alert may not be given at first N−1 times. A numeric value of N may be preset by the user freely. When a minor event on schedule or an alarm event set for a non-major event occurs, when the human body is in the sleep state, the user may be alerted after a delay. A delay time may be set by the user freely. The general event means that when the user is in a state in which it is inconvenient to alert the user, the user is always not alerted or a message alerting method is used for this event.

The alerting policy may include at least: 1. giving a ringing alert; 2. giving a ringing alert after a delay; 3. giving a ringing alert after an accumulated quantity of times; 4. giving a message alert; and 5. giving a vibrating alert. Giving a ringing alert means alerting the user by using a speaker of the terminal (mobile phone). Ring volume may be adjusted automatically according to the human body status information. Giving a ringing alert after a delay means not giving a ringing alert when an event occurs, but giving a ringing alert when a preset delay time arrives. For example, when a time specified by an alarm clock arrives but a sleep time of the user does not reach preset duration, the alarm clock does not ring. The alarm clock automatically rings when a sleep event reaches the preset duration. Giving a ringing alert after an accumulated quantity of times means giving a ringing alert to the user if an event occurs N times consecutively within a limited time range, where a numeric value of N may be preset by the user freely. Giving a message alert means that the user may be silently notified of occurrence of an event by using a message when it is inconvenient to alert the user in an intense disturbing mode such as ringing and/or vibrating. Giving a vibrating alert means that vibration may be used to help alert the user when a ringing alert occurs, where a vibration amplitude may be determined according to the human body status information.

For a defined alerting policy, refer to the following table:

|  | Major event | Minor event | General event |
| --- | --- | --- | --- |
| Sleep state | Ringing alert (ringing) | Do not ring, but ring if the event occurs N times consecutively within a set time range | Ignore and give a message alert |
| Moving state | Increase volume and increase vibration strength | Increase volume and increase vibration strength | Ignore and give a message alert |

It should be noted that the alerting policy may be adjusted according to importance of different events. For example, as regards the alerting policy defined in the table, for a same minor event, the alerting policy varies with different states; in the sleep state, no ringing is given by default; in the moving state, ringing is given by default.

Figure 2:
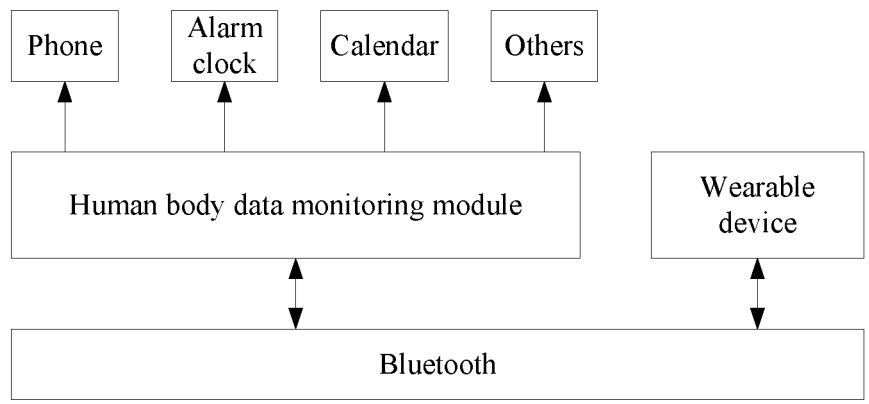
FIG. 2 is a schematic diagram of an association relationship between a human body data monitoring module, upper-layer applications, a wearable device, and Bluetooth according to an embodiment of the present invention.

It should be noted that, the human body data monitoring module provides unified interfaces that can be invoked by upper-layer applications of the terminal. When an upper-layer application of the terminal needs to determine a next-step operation according to the human body status information of the user, the upper-layer application of the terminal obtains the human body status information of the user by using the unified interfaces. The upper-layer application of the terminal may be a phone, an alarm clock, or a calendar, or may be another application. This is not limited herein. In an actual application, referring to FIG. 2, FIG. 2 presents an association relationship between the human body data monitoring module, the upper-layer applications, the wearable device, and Bluetooth.

106. The terminal gives a corresponding alert according to the alerting mode.

In this embodiment, after detecting the basic human body parameter data, the wearable device obtains the human body status information by performing combination processing on the basic human body parameter data. The terminal directly obtains the human body status information to determine the human body status, and determines the alerting mode according to the current human body status and the alerting policy defined by the terminal, thereby implementing intelligent alerting.

In the foregoing embodiment, the performing combination processing on the basic human body parameter data is implemented on the wearable device side. In an optional embodiment, the performing combination processing on the basic human body parameter data may also be implemented on a terminal side. Specifically, the wearable device detects the basic human body parameter data; the wearable device sends the basic human body parameter data to the terminal; the terminal receives the basic human body parameter data sent by the wearable device; the terminal obtains the human body status information by performing combination processing on the basic human body parameter data by using the preset algorithm; and the terminal determines the alerting mode according to the human body status information and the predefined alerting policy, and gives a corresponding alert according to the alerting mode. Obviously, after detecting the basic human body parameter data, the wearable device sends the basic human body parameter data to the terminal. The terminal obtains the human body status information by performing combination processing on the basic human body parameter data, and determines the alerting mode according to the human body status information and the alerting policy defined by the terminal, thereby implementing intelligent alerting.

In the foregoing embodiment, the basic human body parameter data is obtained through detection by the wearable device. In an optional embodiment, the basic human body parameter data may be obtained by the terminal by performing detection. Specifically, the terminal detects the basic human body parameter data; the terminal obtains the human body status information by performing combination processing on the basic human body parameter data by using the preset algorithm; and the terminal determines the alerting mode according to the human body status information and the predefined alerting policy, and gives a corresponding alert according to the alerting mode. Obviously, in this case, the terminal can implement intelligent alerting without the wearable device. For example, when the user holding the terminal (mobile phone) runs, a sensor in the terminal may detect the basic human body parameter data, and further, the terminal obtains the human body status information by performing combination processing, and determines the alerting mode according to the human body status information and the predefined alerting policy.

Optionally, in a possible embodiment, the method may further include: the wearable device detects the basic human body parameter data; the wearable device sends the basic human body parameter data to the terminal; the wearable device receives the human body status information sent by the terminal, where the human body status information is information obtained by the terminal by performing combination processing on the basic human body parameter data by using the preset algorithm; and the wearable device determines the alerting mode according to the human body status information and the predefined alerting policy, and gives a corresponding alert according to the alerting mode, where the human body status information is used to represent the body status of the user. In this way, intelligent alerting on the wearable device side may also be implemented.

Figure 3:
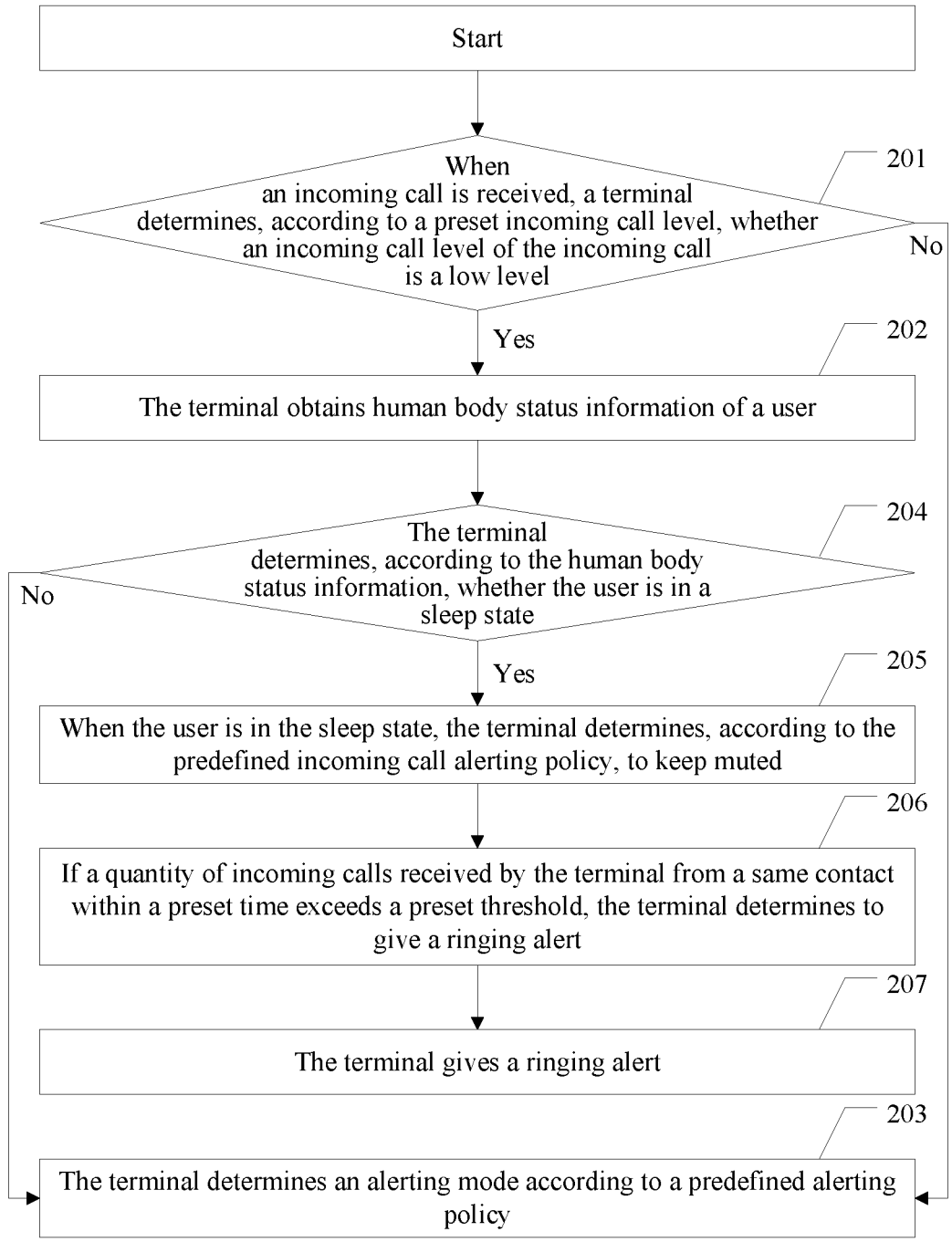
FIG. 3 is a schematic diagram of another embodiment of an intelligent alerting method according to an embodiment of the present invention.

Referring to FIG. 3, another embodiment of an intelligent alerting method in an embodiment of the present invention includes the following steps.

201. When an incoming call is received, a terminal determines, according to a preset incoming call level, whether an incoming call level of the incoming call is a low level, and if yes, performs step 202, or if no, performs step 203.

In this embodiment, a user may first preset incoming call levels for different users in a phone book, where the levels determine an incoming call alerting policy in an incoming call when a human body is in different states: If an incoming call level is a high level, ringing is given directly; if an incoming call level is a low level, no ringing is given, and the user can select to reply to preset information by using a short message; or if a low level incoming call is repeatedly received N times within a short time, a ringing alert is given, where a value of N may be set by the user. In addition, if the incoming call is an incoming call from an unknown person, the incoming call is at a low level by default; or if the incoming call is a nuisance call, the user is alerted by using only a message.

In this embodiment, an alerting event corresponding to a low level incoming call is a minor event, and an alerting event corresponding to a high level incoming call is a major event.

202. The terminal obtains human body status information of a user, and then performs step 204.

In this embodiment, if the incoming call level of the incoming call is a low level, the terminal obtains the human body status information.

Optionally, if the incoming call level of the incoming call is a low level, the terminal determines whether an alerting policy associated with the incoming call is associated with the human body status information; if the terminal determines that the alerting policy is associated with a human body status, the terminal obtains the human body status information; otherwise, the terminal determines an alerting mode according to the alerting policy.

203. The terminal determines an alerting mode according to a predefined alerting policy.

In this embodiment, if the incoming call level is a high level, the alerting mode is determined according to the predefined alerting policy. The alerting mode includes at least one of giving a ringing alert with maximum volume or giving a vibrating alert.

It should be noted that, the high level incoming call is a major event, and is generally an incoming call from an important person. For the incoming call from the important person, whichever state the human body is in, the user is alerted normally in a preset alerting mode.

It should be noted that, when a ringing alert is given, vibration may be used to help alert the user.

204. The terminal determines, according to the human body status information, whether the user is in a sleep state, and if yes, performs step 205, or if no, performs step 203.

It should be noted that, this embodiment of the present invention may also be used to determine whether the user is in another state. That is, if the user is in a non-sleep state, for example, a moving state, the terminal determines, according to the predefined alerting policy, to give a ringing alert. Optionally, the terminal determines, according to the predefined alerting policy, to increase ring volume and/or vibration strength.

It should be noted that, if the user is in the moving state, regardless of whether the incoming call level of the incoming call is a high level or a low level, the user may be alerted by increasing ring volume and/or vibration strength.

205. When the user is in the sleep state, the terminal determines, according to the predefined incoming call alerting policy, to keep muted.

In this embodiment, if the terminal determines that the user is in the sleep state and that the incoming call level of the incoming call is a low level, it indicates that the incoming call is an unimportant incoming call. In this case, the terminal directly ignores ringing for the incoming call, and may alert the user by using a message.

206. If a quantity of incoming calls received by the terminal from a same contact within a preset time exceeds a preset threshold, the terminal determines to give a ringing alert.

In this embodiment, if a quantity of consecutive unimportant incoming calls within a time range set after cancellation of the ringing alert is determined exceeds a numeric value set by the user, the terminal determines to give a ringing alert.

It should be noted that, if the quantity of incoming calls does not exceed the preset threshold, the terminal continues not to ring.

Apparently, this embodiment of the present invention implements an intelligent incoming call alerting function.

For example, in the description of this embodiment, it is assumed that the terminal is a smartphone and that a wearable device is a band device.

The smartphone communicates with the band device by using Bluetooth.

The user presets incoming call levels for different users in the phone book, where the incoming call levels determine an alerting policy in an incoming call when the human body is in different states: If an incoming call level is a high level, a ringing alert is given directly; when the user is in the sleep state and an incoming call level is a low level, no ringing is given, and the user may actively reply to preset information by using a short message; or if a low level incoming call is repeatedly received N times within a short time, a ringing alert is given.

When the mobile phone of the user receives an incoming call, before a phone module gives a ringing alert, the phone module first obtains whether an alerting policy of the phone module is associated with the human body status. If the alerting policy of the phone module is associated with the human body status, the mobile phone receives, by using Bluetooth, basic human body parameter data sent by the band device, and obtains the human body status information by performing combination processing on the basic human body parameter data by using a preset algorithm. If it is found, according to the human body status information, that the user is in the sleep state, and it is found that the incoming call level of the incoming call is a low level, ringing for the incoming call is directly ignored, and the user is notified by using a message. If the incoming call is received three times consecutively in next one minute, a ringing alert is given.

207. The terminal gives a ringing alert.

The alerting event in the foregoing embodiment is an incoming call alerting event. The following embodiment is described by using an alarm clock alerting event as an alerting event.

Figure 4:
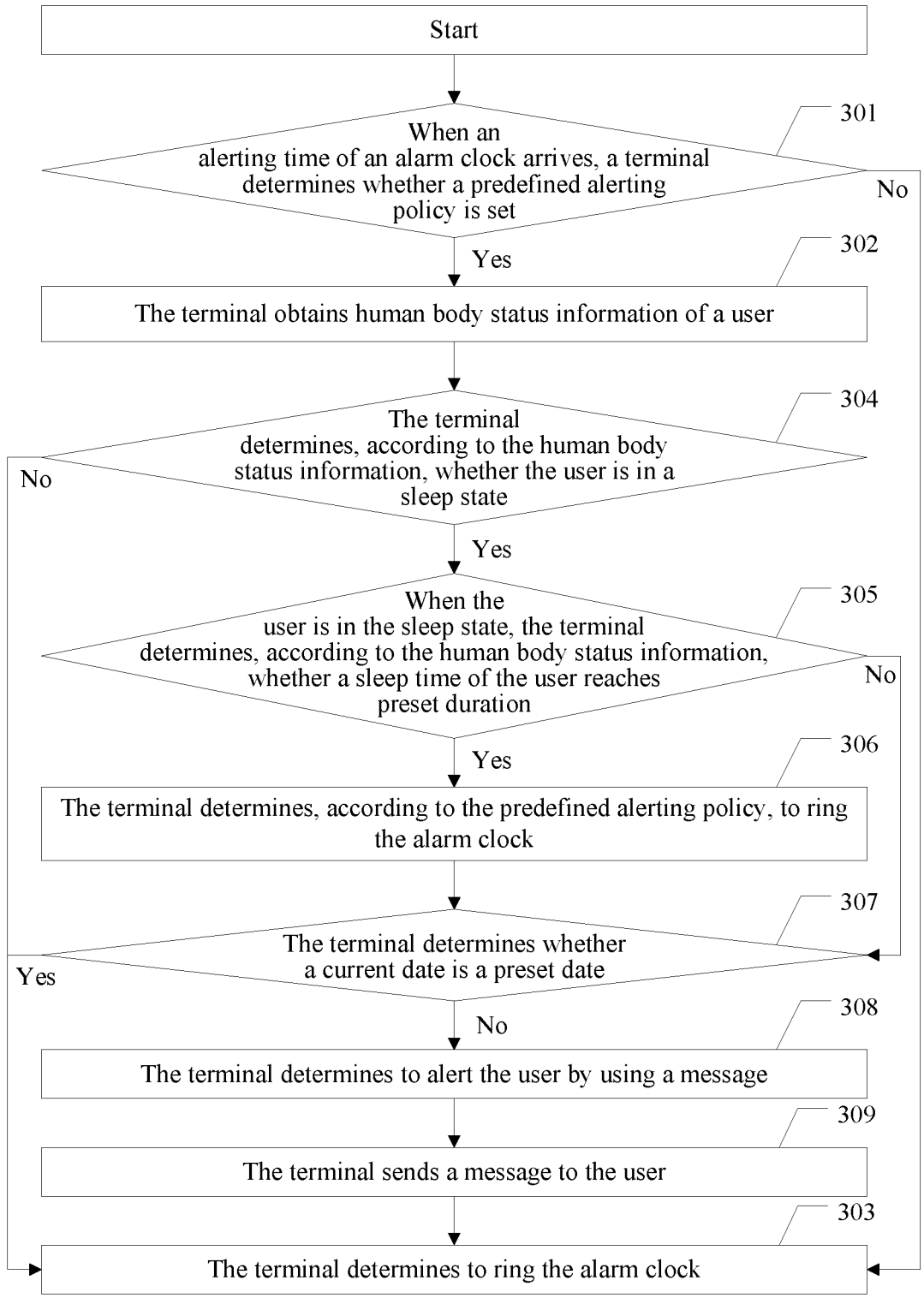
FIG. 4 is a schematic diagram of another embodiment of an intelligent alerting method according to an embodiment of the present invention.

Referring to FIG. 4, another embodiment of an intelligent alerting method in an embodiment of the present invention includes the following steps.

301. When an alerting time of an alarm clock arrives, a terminal determines whether a predefined alerting policy is set, and if yes, performs step 302, or if no, performs step 303.

In this embodiment, a user may set an alerting policy according to a body status of the user, for example, set to ring when a sleep time of the user reaches preset duration.

It should be noted that the alarm clock is an alarm clock set in the terminal.

302. The terminal obtains human body status information of a user, and then performs step 304.

In this embodiment, if the terminal sets the alerting policy, the terminal obtains the human body status information of the user.

303. The terminal determines to ring the alarm clock.

In this embodiment, if the terminal does not set the alerting policy, the terminal normally gives a ringing alert.

304. The terminal determines, according to the human body status information, whether the user is in a sleep state, and if yes, performs step 305, or if no, performs step 303.

In this embodiment, if the user is in a non-sleep state, for example, in a moving state, the terminal determines to give a ringing alert.

305. When the user is in the sleep state, the terminal determines, according to the human body status information, whether a sleep time of the user reaches preset duration, and if yes, performs step 306, or if no, performs step 307.

In this embodiment, the preset duration may be set by the user.

306. The terminal determines, according to the predefined alerting policy, to ring the alarm clock.

In this embodiment, after the user sleeps for the preset duration, the terminal determines to ring the alarm clock.

307. The terminal determines whether a current date is a preset date, and if yes, performs step 303, or if no, performs step 308.

In this embodiment, if the terminal determines that the current date is the preset date, the terminal determines, according to the predefined alerting policy, to ring the alarm clock. The preset date may be a workday, an overtime day, or the like.

308. The terminal determines to alert the user by using a message.

In this embodiment, the terminal determines, according to the human body status information, that the sleep time of the user does not reach the preset duration, and the current time is a non workday (weekend or holiday), the terminal determines to alert the user by using a message.

In this embodiment, if the user does not sleep for the preset duration, the alarm clock may be automatically ignored, or the user is alerted by delaying the alarm clock. When the alarm clock is ignored, the user is notified by using a muted message. The setting of the delayed alarm clock may be setting to start ringing after the sleep time of the user reaches the preset duration.

309. The terminal sends a message to the user.

Apparently, this embodiment of the present invention implements an intelligent alarm clock ringing alerting function.

The intelligent alerting method according to the present invention is described by using the foregoing embodiment. A terminal and a wearable device according to the present invention are described by using embodiments.

Figure 5:
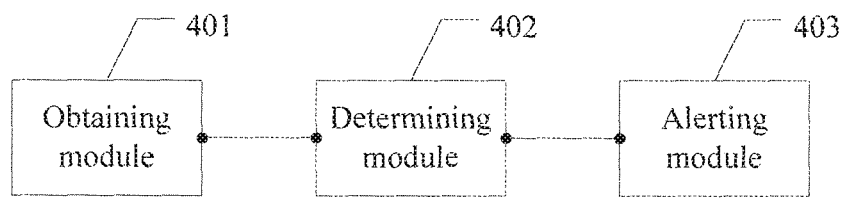
FIG. 5 is a schematic diagram of an embodiment of a terminal according to an embodiment of the present invention.

Referring to FIG. 5, an embodiment of a terminal in an embodiment of the present invention includes:

an obtaining module 401, configured to obtain human body status information of a user, where the human body status information is status information obtained after basic human body parameter data is combined, the human body status information is used to represent a body status of the user, and the basic human body parameter data is vital sign data obtained through detection by the terminal or by a wearable device that has a communications connection relationship with the terminal;

a determining module 402, configured to determine an alerting mode according to the human body status information and a predefined alerting policy; and an alerting module 403, configured to give a corresponding alert according to the alerting mode.

In this embodiment, human body status information related to basic human body parameter data is obtained, and an alerting occasion and mode are determined intelligently according to the human body status information.

Optionally, the obtaining module 401 is specifically configured to obtain the basic human body parameter data sent by the wearable device and obtain the human body status information by performing combination processing on the basic human body parameter data by using a preset algorithm; or the obtaining module 401 is specifically configured to receive the human body status information sent by the wearable device.

In some embodiments of the present invention, the obtaining module 401 is specifically configured to obtain the human body status information of the user when an incoming call is received if it is determined, according to a preset incoming call level, that an incoming call level of the incoming call is a low level. The determining module 402 is specifically configured to determine, according to the human body status information, that the user is in a sleep state, and when the user is in the sleep state, determine, according to the predefined alerting policy, to keep muted.

Further optionally, the determining module 402 is further configured to determine an alerting mode according to the predefined alerting policy if it is determined, according to the preset incoming call level, that the incoming call level of the incoming call is a high level, where the alerting mode includes at least one of giving a ringing alert with maximum volume or giving a vibrating alert.

Alternatively optionally, the determining module 402 is further configured to determine to give a ringing alert if a quantity of incoming calls received from a same contact within a preset time exceeds a preset threshold.

Optionally, the obtaining module 401 is specifically configured to obtain the human body status information of the user when an incoming call is received; and the determining module 402 is specifically configured to determine, according to the human body status information, that the user is in a moving state, and when the user is in the moving state, determine, according to the predefined alerting policy, to increase ring volume and/or vibration strength.

In some embodiments of the present invention, the obtaining module 401 is specifically configured to obtain the human body status information of the user when an alerting time of an alarm clock arrives if it is determined that the predefined alerting policy is set; and the determining module 402 is specifically configured to determine, according to the human body status information, that the user is in a sleep state, and when the user is in the sleep state, if it is determined, according to the human body status information, that a sleep time of the user in the sleep state reaches preset duration, determine, according to the predefined alerting policy, to ring the alarm clock.

Figure 6:
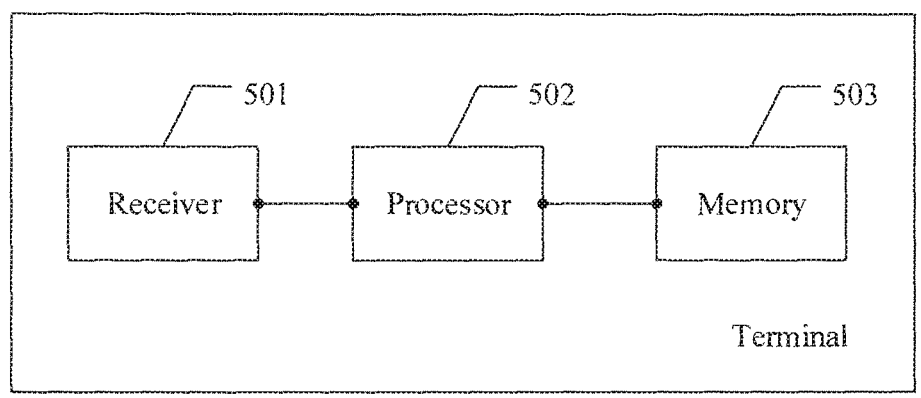
FIG. 6 is a schematic diagram of another embodiment of a terminal according to an embodiment of the present invention.

In the embodiment shown in FIG. 5, a specific structure of the terminal is described from a perspective of functional modules. The following describes a specific structure of a terminal from a perspective of hardware with reference to an embodiment in FIG. 6.

The terminal includes a receiver 501, a processor 502, and a memory 503.

The receiver 501 is configured to obtain human body status information of a user, where the human body status information is status information obtained after basic human body parameter data is combined, the human body status information is used to represent a body status of the user, and the basic human body parameter data is vital sign data obtained through detection by the processor or by a wearable device that has a communications connection relationship with the receiver.

The processor 502 is configured to determine an alerting mode according to the human body status information and a predefined alerting policy, and give a corresponding alert according to the alerting mode.

The memory 503 is configured to store one or more programs, where the one or more programs include an instruction, and when the instruction is executed by the processor 502, the processor 502 performs a corresponding step.

Optionally, the receiver 501 is specifically configured to obtain the human body status information of the user when an incoming call is received if the processor 502 determines, according to a preset incoming call level, that an incoming call level of the incoming call is a low level; and the processor 502 is specifically configured to determine, according to the human body status information, that the user is in a sleep state, and when the user is in the sleep state, determine, according to the predefined alerting policy, to keep muted.

Further optionally, the processor 502 is further configured to determine an alerting mode according to the predefined alerting policy if it is determined, according to the preset incoming call level, that the incoming call level of the incoming call is a high level, where the alerting mode includes at least one of giving a ringing alert with maximum volume or giving a vibrating alert.

Optionally, the processor 502 is further configured to determine to give a ringing alert if a quantity of incoming calls received by the receiver 501 from a same contact within a preset time exceeds a preset threshold.

Optionally, the receiver 501 is specifically configured to obtain the human body status information of the user when an incoming call is received; and the processor 502 is specifically configured to determine, according to the human body status information, that the user is in a moving state, and when the user is in the moving state, determine, according to the predefined alerting policy, to increase ring volume and/or vibration strength.

Optionally, the receiver 501 is specifically configured to obtain the human body status information of the user when an alerting time of an alarm clock arrives if the processor 502 determines that the predefined alerting policy is set; and the processor 502 is specifically configured to determine, according to the human body status information, that the user is in a sleep state, and when the user is in the sleep state, if the processor 502 determines, according to the human body status information, that a sleep time of the user in the sleep state reaches preset duration, determine, by the processor 502 according to the predefined alerting policy, to ring the alarm clock.

Further optionally, the processor 502 is further configured to: if it is determined, according to the human body status information, that the sleep time of the user in the sleep state does not reach the preset duration, determine, according to the predefined alerting policy, to alert the user by using a message, or if it is determined that a current date is a workday, determine, according to the predefined alerting policy, to ring the alarm clock.

Optionally, the receiver 501 is further configured to receive the basic human body parameter data sent by the wearable device; and the processor 502 is further configured to obtain the human body status information by performing combination processing on the basic human body parameter data by using a preset algorithm.

It should be noted that the processor 502 may be a CPU. The processor 502 may also be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor, or the like. In an implementation process, the instruction may be completed by using an integrated logic circuit of hardware in the processor 502 or an instruction in a form of software, and may be directly executed and completed by means of a hardware processor, or may be executed and completed by using a combination of hardware in the processor and a software module. The software module may be located in a mature storage medium in the art, such as a random access memory, a flash memory, a read-only memory, a programmable read-only memory, an electrically erasable programmable memory, or a register.

The storage medium is located in the memory 503. The processor 502 reads information in the memory 503 and completes corresponding steps in combination with hardware of the processor 502.

Figure 7:
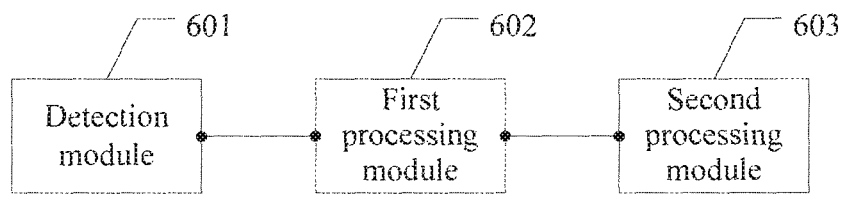
FIG. 7 is a schematic diagram of an embodiment of a wearable device according to an embodiment of the present invention.

Referring to FIG. 7, an embodiment of a wearable device in an embodiment of the present invention includes:

a detection module 601, configured to detect basic human body parameter data;

a first processing module 602, configured to obtain human body status information of a user by performing combination processing on the basic human body parameter data by using a preset algorithm, where the human body status information is used to represent a body status of the user; and a second processing module 603, configured to send the human body status information to a terminal, so that the terminal determines an alerting mode according to the human body status information and a predefined alerting policy and gives a corresponding alert according to the alerting mode; and/or configured to determine an alerting mode according to the human body status information and a predefined alerting policy, and give a corresponding alert according to the alerting mode.

Figure 8:
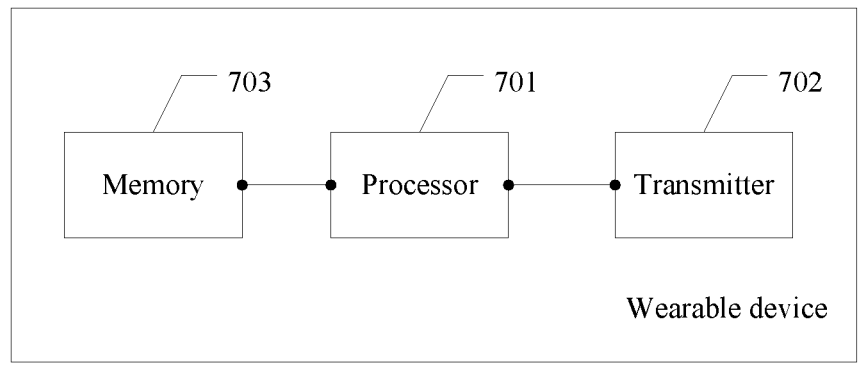
FIG. 8 is a schematic diagram of another embodiment of a wearable device according to an embodiment of the present invention.

In the embodiment shown in FIG. 7, a specific structure of the wearable device is described from a perspective of functional modules. The following describes a specific structure of a wearable device from a perspective of hardware with reference to an embodiment in FIG. 8.

The wearable device includes a processor 701, a transmitter 702, and a memory 703.

The processor 701 is configured to detect basic human body parameter data, and obtain human body status information of a user by performing combination processing on the basic human body parameter data by using a preset algorithm, where the human body status information is used to represent a body status of the user.

The transmitter 702 is configured to send the human body status information to a terminal, so that the terminal determines an alerting mode according to the human body status information and a predefined alerting policy and gives a corresponding alert according to the alerting mode; and/or the processor 701 is further configured to determine an alerting mode according to the human body status information and a predefined alerting policy, and give a corresponding alert according to the alerting mode.

The memory 703 is configured to store one or more programs, where the one or more programs include an instruction, and when the instruction is executed by the processor 701, the processor 701 performs a corresponding step.

Figure 9:
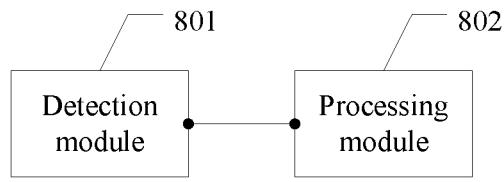
FIG. 9 is a schematic diagram of another embodiment of a wearable device according to an embodiment of the present invention.

Referring to FIG. 9, another embodiment of a wearable device in an embodiment of the present invention includes:

a detection module 801, configured to detect basic human body parameter data; and a processing module 802, configured to send the basic human body parameter data to a terminal, so that the terminal obtains human body status information of a user by performing combination processing on the basic human body parameter data by using a preset algorithm, determines an alerting mode according to the human body status information and a predefined alerting policy, and gives a corresponding alert according to the alerting mode; and/or configured to send the basic human body parameter data to a terminal, receive human body status information sent by the terminal, where the human body status information is information obtained by the terminal by performing combination processing on the basic human body parameter data by using a preset algorithm, determine an alerting mode according to the human body status information and a predefined alerting policy, and give a corresponding alert according to the alerting mode, where the human body status information is used to represent a body status of the user.

Figure 10:
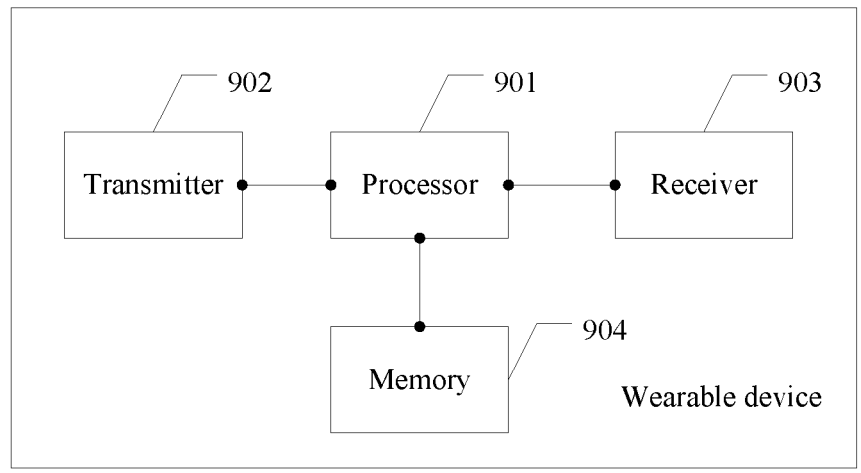
FIG. 10 is a schematic diagram of another embodiment of a wearable device according to an embodiment of the present invention.

In the embodiment shown in FIG. 9, a specific structure of the wearable device is described from a perspective of functional modules. The following describes a specific structure of a wearable device from a perspective of hardware with reference to an embodiment in FIG. 10.

The wearable device includes a processor 901, a transmitter 902, a receiver 903, and a memory 904.

The processor 901 is configured to detect basic human body parameter data.

The transmitter 902 is configured to send the basic human body parameter data to a terminal, so that the terminal obtains human body status information of a user by performing combination processing on the basic human body parameter data by using a preset algorithm, determines an alerting mode according to the human body status information and a predefined alerting policy, and gives a corresponding alert according to the alerting mode; and/or the transmitter 902 is configured to send the basic human body parameter data to a terminal; the receiver 903 is configured to receive human body status information sent by the terminal, where the human body status information is information obtained by the terminal by performing combination processing on the basic human body parameter data by using a preset algorithm; and the processor 901 is further configured to determine an alerting mode according to the human body status information and a predefined alerting policy, and give a corresponding alert according to the alerting mode, where the human body status information is used to represent a body status of the user.

The memory 904 is configured to store one or more programs, where the one or more programs include an instruction, and when the instruction is executed by the processor 901, the processor 901 performs a corresponding step.

Figure 11:
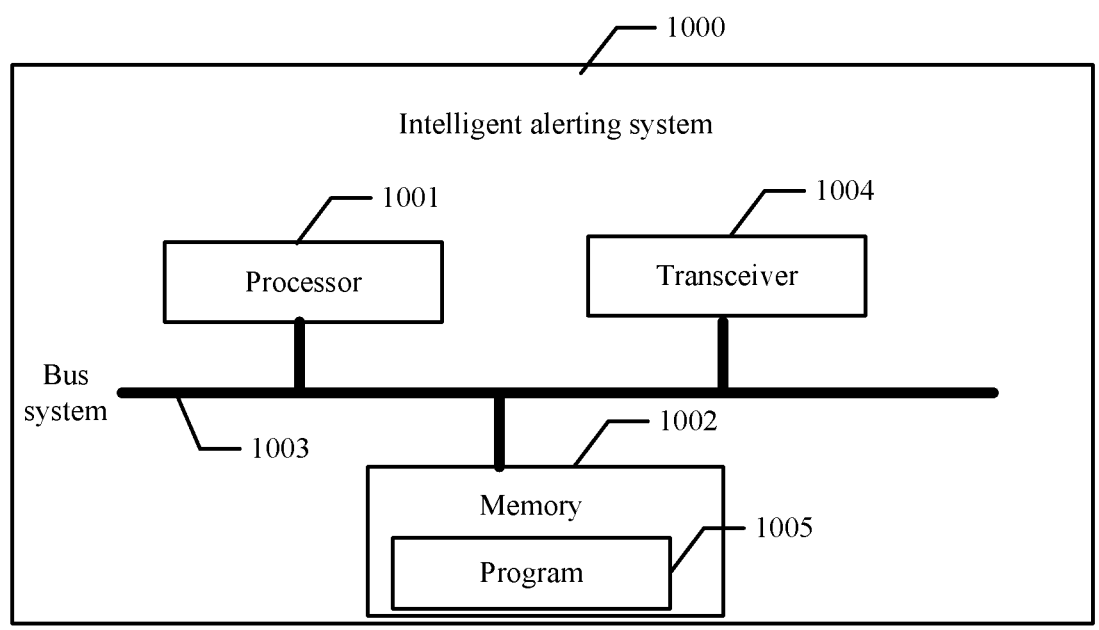
FIG. 11 is a schematic diagram of an embodiment of an intelligent alerting system according to an embodiment of the present invention.

The following describes a specific structure of an intelligent alerting system from a perspective of hardware with reference to an embodiment in FIG. 11:

one or more processors 1001, a memory 1002, a bus system 1003, and a transceiver 1004, where the processor 1001, the memory 1002, and the transceiver 1004 are connected by the bus system 1003.

The memory 1002 stores one or more programs 1005. The one or more programs 1005 include an instruction. When the instruction is executed by the intelligent alerting system 1000, the intelligent alerting system 1000 performs the methods shown in FIG. 1, FIG. 3, and FIG. 4.

Figure 12:
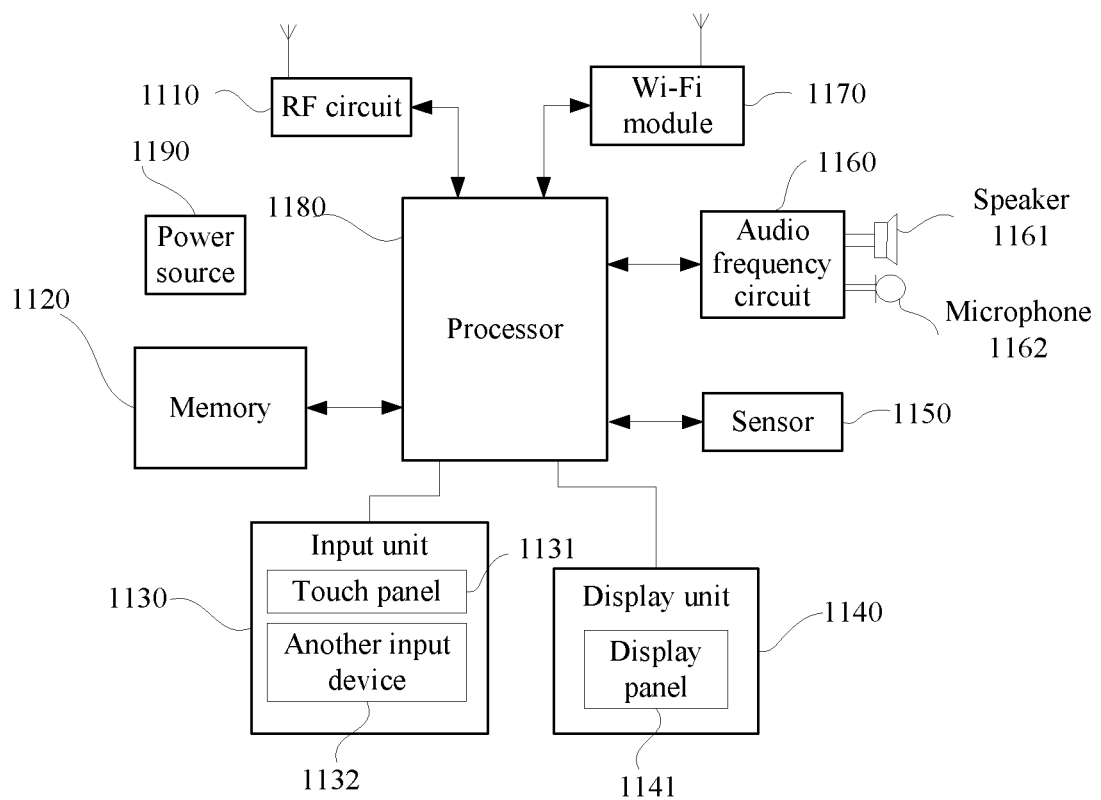
FIG. 12 is a schematic structural diagram of a terminal according to an embodiment of the present invention.

An embodiment of the present invention further provides a terminal. As shown in FIG. 12, for ease of description, only parts that are related to this embodiment of the present invention are illustrated. For specific technical details that are not disclosed, refer to the method part in the embodiments of the present invention. The terminal may be any terminal device including a mobile phone, a tablet computer, a PDA (Personal Digital Assistant, personal digital assistant), a POS (Point of Sales, point of sale), an in-vehicle computer, or the like. For example, the terminal is a mobile phone.

FIG. 12 is a block diagram of a partial structure of a mobile phone related to a terminal according to an embodiment of the present invention. Referring to FIG. 12, the mobile phone includes components such as a radio frequency (Radio Frequency, RF) circuit 1110, a memory 1120, an input unit 1130, a display unit 1140, a sensor 1150, an audio frequency circuit 1160, a Wireless Fidelity (wireless fidelity, Wi-Fi) module 1170, a processor 1180, and a power source 1190. Persons skilled in the art may understand that, a structure of the mobile phone shown in FIG. 12 does not constitute a limitation on the mobile phone. A quantity of components included may be greater or less than that shown in the figure, or some components are combined, or component arrangements are different.

The following describes each component of the mobile phone in detail with reference to FIG. 12.

The RF circuit 1110 may be configured to receive or transmit signals in an information reception or transmission process or a call process, and in particular, after receiving downlink information from a base station, transmit the downlink information to the processor 1180 for processing, and in addition, transmit designed uplink data to the base station. Generally, the RF circuit 1110 includes but is not limited to an antenna, at least one amplifier, a transceiver, a coupler, a low noise amplifier (Low Noise Amplifier, LNA), a duplexer, or the like. In addition, the RF circuit 1110 may further communicate with a network and other devices through wireless communication. The wireless communication may use any communications standard or protocol, including but not limited to the Global System for Mobile communication (Global System of Mobile communication, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), e-mail, short message service (Short Messaging Service, SMS), and the like.

The memory 1120 may be configured to store a software program and module. The processor 1180 executes various function applications and data processing of the mobile phone by running the software program and module stored in the memory 1120. The memory 1120 may mainly include a program storage area and a data storage area. The program storage area may store an operating system, an application program required by at least one function (such as an audio playing function or an image playing function), or the like. The data storage area may store data (such as audio data or a phone book) that is created according to usage of the mobile phone, or the like. In addition, the memory 1120 may include a high-speed random access memory, and may further include a non-volatile memory, for example, at least one magnetic disk storage, a flash memory, or another volatile solid state memory.

The input unit 1130 may be configured to receive input digit or character information, and generate a key signal input related to a user setting and function control of the mobile phone. Specifically, the input unit 1130 may include a touch panel 1131 and another input device 1132. The touch panel 1131, also referred to as a touchscreen, may capture a touch operation of a user on or near the touch panel (for example, an operation performed by the user by using any appropriate object or accessory such as a finger or a stylus on the touch panel 1131 or near the touch panel 1131), and drive a corresponding connection apparatus according to a preset program. Optionally, the touch panel 1131 may include two parts: a touch detection apparatus and a touch controller. The touch detection apparatus detects a touch direction of the user, detects a signal generated by the touch operation, and transmits the signal to the touch controller. The touch controller receives touch information from the touch detection apparatus, converts the touch information into touch point coordinates, and transmits the touch point coordinates to the processor 1180, and can receive a command transmitted by the processor 1180 and execute the command. In addition, the touch panel 1131 may be implemented by using multiple types such as resistive, capacitive, infrared, and surface acoustic wave. In addition to the touch panel 1131, the input unit 1130 may further include the another input device 1132. Specifically, the another input device 1132 may include but is not limited to one or more of a physical keyboard, a function key (such as a volume control key or a power-on/off key), a trackball, a mouse, a joystick, or the like.

The display unit 1140 may be configured to display information input by the user or information provided for the user and various menus of the mobile phone. The display unit 1140 may include a display panel 1141. Optionally, the display panel 1141 may be configured in a form of a liquid crystal display (Liquid Crystal Display, LCD), an organic light-emitting diode (Organic Light-Emitting Diode, OLED), or the like. Further, the touch panel 1131 may cover the display panel 1141. When the touch panel 1131 detects a touch operation on or near the touch panel, the touch panel 1131 transmits the touch operation to the processor 1180 to determine a type of a touch event. Then the processor 1180 provides a corresponding visual output on the display panel 1141 according to the type of the touch event. Although the touch panel 1131 and the display panel 1141 are used as two independent components to implement input and input functions of the mobile phone in FIG. 12, the touch panel 1131 and the display panel 1141 may be integrated to implement input and output functions of the mobile phone in some embodiments.

The mobile phone may further include at least one sensor 1150, for example, a light sensor, a motion sensor, or another sensor. Specifically, the light sensor may include an ambient light sensor and a proximity sensor. The ambient light sensor may adjust luminance of the display panel 1141 according to brightness of ambient light. The proximity sensor may turn off and/or backlight the display panel 1141 when the mobile phone moves to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture application of the mobile phone (such as switching between landscape and portrait, related games, and magnetometer posture calibration), vibration recognition related functions (such as a pedometer and stroke), and the like. As regards other sensors that can be configured for the mobile phone, such as a gyroscope, a barometer, a hygrometer, a thermometer, and an infrared sensor, details are not described herein.

The audio frequency circuit 1160, a speaker 1161, and a microphone 1162 may provide an audio interface between the user and the mobile phone. The audio frequency circuit 1160 may transmit an electrical signal converted from received audio data to the speaker 1161, and the speaker 1161 converts the electrical signal into an audio signal for outputting. On the other hand, the microphone 1162 converts a captured audio signal into an electrical signal, and the audio frequency circuit 1160 converts the received electrical signal into audio data, and then outputs the audio data to the processor 1180 for processing; then the audio data is transmitted to another mobile phone through the RF circuit 1110, or the audio data is output to the memory 1120 for further processing.

Wi-Fi is a short-distance wireless transmission technology. By using the Wi-Fi module 1170, the mobile phone may help the user send and receive e-mails, browse web pages, access streaming media, and so on. Wi-Fi provides wireless broadband Internet access for the user. Although FIG. 12 shows the Wi-Fi module 1170, it may be understood that, the Wi-Fi module 1170 is not a necessary component of the mobile phone, and may be completely omitted according to a requirement without changing the essence of the present invention.

The processor 1180 is a control center of the mobile phone. The processor 1180 uses various interfaces and lines to connect all parts of the entire mobile phone, and executes various functions and data processing of the mobile phone by running or executing the software program and/or module stored in the memory 1120 and invoking data stored in the memory 1120, thereby performing overall monitoring on the mobile phone. Optionally, the processor 1180 may include one or more processing units. Preferably, the processor 1180 may integrate an application processor and a modem processor. The application processor mainly processes the operating system, a user interface, an application program, and the like. The modem processor mainly processes wireless communication. It may be understood that, the modem processor may also not be integrated with the processor 1180.

The mobile phone further includes the power source 1190 (such as a battery) supplying power to each component. Preferably, the power source may be logically connected to the processor 1180 by using a power management system, so as to implement functions such as charge and discharge management and power consumption management by using the power management system.

Although not shown, the mobile phone may further include a camera, a Bluetooth module, and the like. Details are not described herein.

In this embodiment of the present invention, the processor 1180 included in the terminal further has the following functions:

obtaining human body status information of a user, where the human body status information is status information obtained after basic human body parameter data is combined, the human body status information is used to represent a body status of the user, and the basic human body parameter data is vital sign data obtained through detection by the terminal or by a wearable device that has a communications connection relationship with the terminal;

determining an alerting mode according to the human body status information and a predefined alerting policy; and giving a corresponding alert according to the alerting mode.

This embodiment further provides a specific implementation solution for obtaining the human body status information of the user and determining the alerting mode. As described below, the processor 1180 is specifically configured to control execution of: obtaining the human body status information of the user when an incoming call is received if it is determined, according to a preset incoming call level, that an incoming call level of the incoming call is a low level; and determining, according to the human body status information, that the user is in a sleep state, and when the user is in the sleep state, determining, according to the predefined alerting policy, to keep muted.

This embodiment further provides a specific implementation solution for determining an alerting method when the incoming call level of the incoming call is a high level. As described below, the processor 1180 is specifically configured to control execution of: determining an alerting mode according to the predefined alerting policy if it is determined, according to the preset incoming call level, that the incoming call level of the incoming call is a high level, where the alerting mode includes at least one of giving a ringing alert with maximum volume or giving a vibrating alert.

This embodiment further provides a specific implementation solution for processing if a quantity of incoming calls exceeds a preset threshold. As described below, the processor 1180 is specifically configured to control execution of: determining to give a ringing alert if a quantity of incoming calls received from a same contact within a preset time exceeds a preset threshold.

This embodiment further provides another specific implementation solution for obtaining the human body status information of the user and determining the alerting mode. As described below, the processor 1180 is specifically configured to control execution of: obtaining the human body status information of the user when an incoming call is received; and determining, according to the human body status information, that the user is in a moving state, and when the user is in the moving state, determining, according to the predefined alerting policy, to increase ring volume and/or vibration strength.

This embodiment further provides another specific implementation solution for obtaining the human body status information of the user and determining the alerting mode. As described below, the processor 1180 is specifically configured to control execution of: obtaining the human body status information of the user when an alerting time of an alarm clock arrives if it is determined that the predefined alerting policy is set; and the determining an alerting mode according to the human body status information and a predefined alerting policy includes: determining, according to the human body status information, that the user is in a sleep state, and when the user is in the sleep state, if it is determined, according to the human body status information, that a sleep time of the user in the sleep state reaches preset duration, determining, according to the predefined alerting policy, to ring the alarm clock.

This embodiment further provides a specific implementation solution for processing if the sleep time does not reach the preset duration. As described below, the processor 1180 is specifically configured to control execution of: determining, according to the predefined alerting policy, to alert the user by using a message, or if it is determined that a current date is a workday, determining, according to the predefined alerting policy, to ring the alarm clock.

This embodiment further provides another specific implementation solution for obtaining the human body status information of the user. As described below, the processor 1180 is specifically configured to control execution of: receiving the basic human body parameter data sent by the wearable device, and obtaining the human body status information by performing combination processing on the basic human body parameter data by using a preset algorithm.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An intelligent alerting method implemented by a terminal, comprising:
   obtaining human body status information of a user, comprising status information that is obtained after combining basic human body parameter data, wherein the human body status information represents a body status of the user, and wherein the basic human body parameter data comprises vital sign data that is detected at the terminal or is received from a wearable device in communication with the terminal;
   determining, according to the human body status information, that the user is in a sleep state;
   determining an alerting mode according to the human body status information and a predefined alerting policy; and
   providing, according to the predefined alerting policy, an alert to the user using a message when a sleep time of the user does not reach a preset duration time.

2. The intelligent alerting method of claim 1, wherein obtaining the human body status information of the user comprises obtaining the human body status information of the user when an incoming call is received and an incoming call level of the incoming call comprises a low level, and wherein determining the alerting mode comprises determining, according to the predefined alerting policy, to keep the alert muted when the user is in the sleep state.

3. The intelligent alerting method of claim 2, further comprising determining the alerting mode according to the predefined alerting policy, wherein the incoming call level of the incoming call comprises a high level, and wherein the alerting mode comprises a ringing alert with maximum volume.

4. The intelligent alerting method according to claim 2, wherein after determining to keep the alert muted, the method further comprises determining to provide a ringing alert when a quantity of incoming calls received by the terminal from a same contact within a preset time exceeds a preset threshold quantity.

5. The intelligent alerting method of claim 1, wherein obtaining the human body status information of the user comprises obtaining the human body status information when an incoming call is received, and wherein determining the alerting mode comprises:
   determining, according to the human body status information, that the user is in a moving state; and
   determining, according to the predefined alerting policy, to increase ring volume and vibration strength when the user is in the moving state.

6. The intelligent alerting method of claim 1, wherein obtaining the human body status information of the user comprises obtaining the human body status information when an alerting time of an alarm clock arrives and the predefined alerting policy is set, and wherein determining the alerting mode comprises determining, according to the predefined alerting policy, to ring the alarm clock when the user is in the sleep state and the sleep time of the user in the sleep state reaches the preset duration time.

7. The intelligent alerting method of claim 1, wherein obtaining the human body status information of the user comprises:
   receiving the basic human body parameter data from the wearable device; and performing combination processing on the basic human body parameter data using a preset algorithm to obtain the human body status information.

8. The method of claim 2, further comprising determining the alerting mode according to the predefined alerting policy when the the incoming call level of the incoming call comprises a high level, and wherein the alerting mode comprises providing a vibrating alert.

9. The intelligent alerting method of claim 1, wherein obtaining the human body status information of the user comprises obtaining the human body status information of the user when an incoming call is received, and wherein determining the alerting mode comprises:
  determining, according to the human body status information, that the user is in a moving state; and
  determining, according to the predefined alerting policy, to increase ring volume when the user is in the moving state.

10. The intelligent alerting method of claim 1, wherein obtaining the human body status information of the user comprises obtaining the human body status information of the user when an incoming call is received, and wherein determining the alerting mode comprises:
  determining, according to the human body status information, that the user is in a moving state; and
  determining, according to the predefined alerting policy, to increase vibration strength when the user is in the moving state.

11. The intelligent alerting method of claim 6, wherein the method further comprises determining, according to the predefined alerting policy, to ring the alarm clock when a current date comprises a workday.

12. A terminal, comprising:
  a receiver configured to obtain human body status information of a user comprising status information that is obtained after combining basic human body parameter data, wherein the human body status information represents a body status of the user, and wherein the basic human body parameter data comprises vital sign data that is detected at a processor or is received from a wearable device in communication with the receiver, and
  the processor coupled to the receiver and configured to:
    determine that the user is in a sleep state;
    determine an alerting mode according to the human body status information and a predefined alerting policy; and
    provide an alert to the user using a message when a sleep time of the user does not reach a preset duration time.

13. The terminal of claim 12, wherein the receiver is further configured to obtain the human body status information of the user when an incoming call is received and an incoming call level of the incoming call comprises a low level, and wherein the processor is further configured to determine, according to the predefined alerting policy, to keep the alert muted when the user is in the sleep state.

14. The terminal of claim 13, wherein the processor is further configured to determine the alerting mode according to the predefined alerting policy wherein the incoming call level of the incoming call comprises a high level, and wherein the alerting mode comprises a ringing alert with maximum volume or providing a vibrating alert.

15. The terminal of claim 13, wherein the processor is further configured to determine to provide a ringing alert when a quantity of incoming calls received by the receiver from a same contact within a preset time exceeds a preset threshold quantity.

16. The terminal of claim 12, wherein the receiver is further configured to obtain the human body status information of the user when an incoming call is received, and wherein the processor is further configured to:
  determine, according to the human body status information, that the user is in a moving state; and
  determine, according to the predefined alerting policy, to increase ring volume or vibration strength when the user is in the moving state.

17. The terminal of claim 12, wherein the receiver is further configured to obtain the human body status information of the user when an alerting time of an alarm clock arrives and the predefined alerting policy is set, and wherein the processor is further configured to determine, according to the predefined alerting policy, to ring the alarm clock when the user is in the sleep state and the sleep time of the user in the sleep state reaches the preset duration time.

18. The terminal of claim 17, wherein the processor is further configured to determine, according to the predefined alerting policy, to ring the alarm clock when a current date comprises a workday.

19. The terminal of claim 12, wherein the receiver is further configured to receive the basic human body parameter data from the wearable device, and wherein the processor is further configured perform combination processing on the basic human body parameter data using a preset algorithm to obtain the human body status information.

* * * * *